United States Patent  
Mitchell

(10) Patent No.: US 8,599,956 B1
(45) Date of Patent: Dec. 3, 2013

(54) DOPPLER COMPENSATED COMMUNICATIONS LINK

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 399 days.

(21) Appl. No.: 12/891,107

(22) Filed: Sep. 27, 2010

(51) Int. Cl.
*H04B 15/00* (2006.01)

(52) U.S. Cl.
USPC .......................................................... 375/285

(58) Field of Classification Search
None
See application file for complete search history.

(56) References Cited

U.S. PATENT DOCUMENTS

| | | | |
|---|---|---|---|
| 6,529,706 B1 | 3/2003 | Mitchell | |
| 6,614,126 B1 | 9/2003 | Mitchell | |
| 6,675,013 B1 * | 1/2004 | Gross et al. | 455/431 |
| 6,741,841 B1 | 5/2004 | Mitchell | |
| 7,095,336 B2 * | 8/2006 | Rodgers et al. | 340/903 |
| 7,187,927 B1 | 3/2007 | Mitchell | |
| 7,280,498 B1 | 10/2007 | Mitchell | |
| 7,343,157 B1 | 3/2008 | Mitchell | |
| 7,483,696 B1 | 1/2009 | Mitchell | |
| 7,496,361 B1 | 2/2009 | Mitchell et al. | |
| 7,599,691 B1 | 10/2009 | Mitchell | |
| 7,653,347 B2 * | 1/2010 | Klotsche et al. | 455/10 |
| 7,761,793 B1 | 7/2010 | Mitchell | |
| 7,865,132 B2 | 1/2011 | Mitchell | |
| 2005/0020203 A1 * | 1/2005 | Losh et al. | 455/11.1 |
| 2005/0073438 A1 * | 4/2005 | Rodgers et al. | 340/944 |
| 2007/0021122 A1 * | 1/2007 | Lane et al. | 455/441 |
| 2007/0161347 A1 * | 7/2007 | Ma et al. | 455/11.1 |
| 2007/0197165 A1 * | 8/2007 | Klotsche et al. | 455/63.1 |
| 2010/0201545 A1 * | 8/2010 | Narea et al. | 340/936 |
| 2010/0317293 A1 * | 12/2010 | Yokoyama | 455/63.1 |
| 2012/0238272 A1 * | 9/2012 | Hwang et al. | 455/436 |
| 2013/0030694 A1 * | 1/2013 | Nortrup | 701/410 |

FOREIGN PATENT DOCUMENTS

JP 2003309517 A * 10/2003 ............... H04B 7/26

* cited by examiner

*Primary Examiner* — Chieh M Fan
*Assistant Examiner* — Bahman Badipour
(74) *Attorney, Agent, or Firm* — Donna P. Suchy; Daniel M. Barbieri

(57) ABSTRACT

A system for compensating for a Doppler frequency shift in communications between a mobile node and a fixed node. The system includes a Doppler frequency shift estimation unit configured to estimate the Doppler frequency shift experienced in a communication signal between the mobile node and the fixed node, wherein the Doppler frequency shift is estimated based on a location of the mobile node, a heading of the mobile node, and speed of the mobile node, and a location of the fixed node. The system also includes a frequency shift unit configured to shift a frequency of the communication signal in accordance with the estimated Doppler frequency shift.

12 Claims, 7 Drawing Sheets

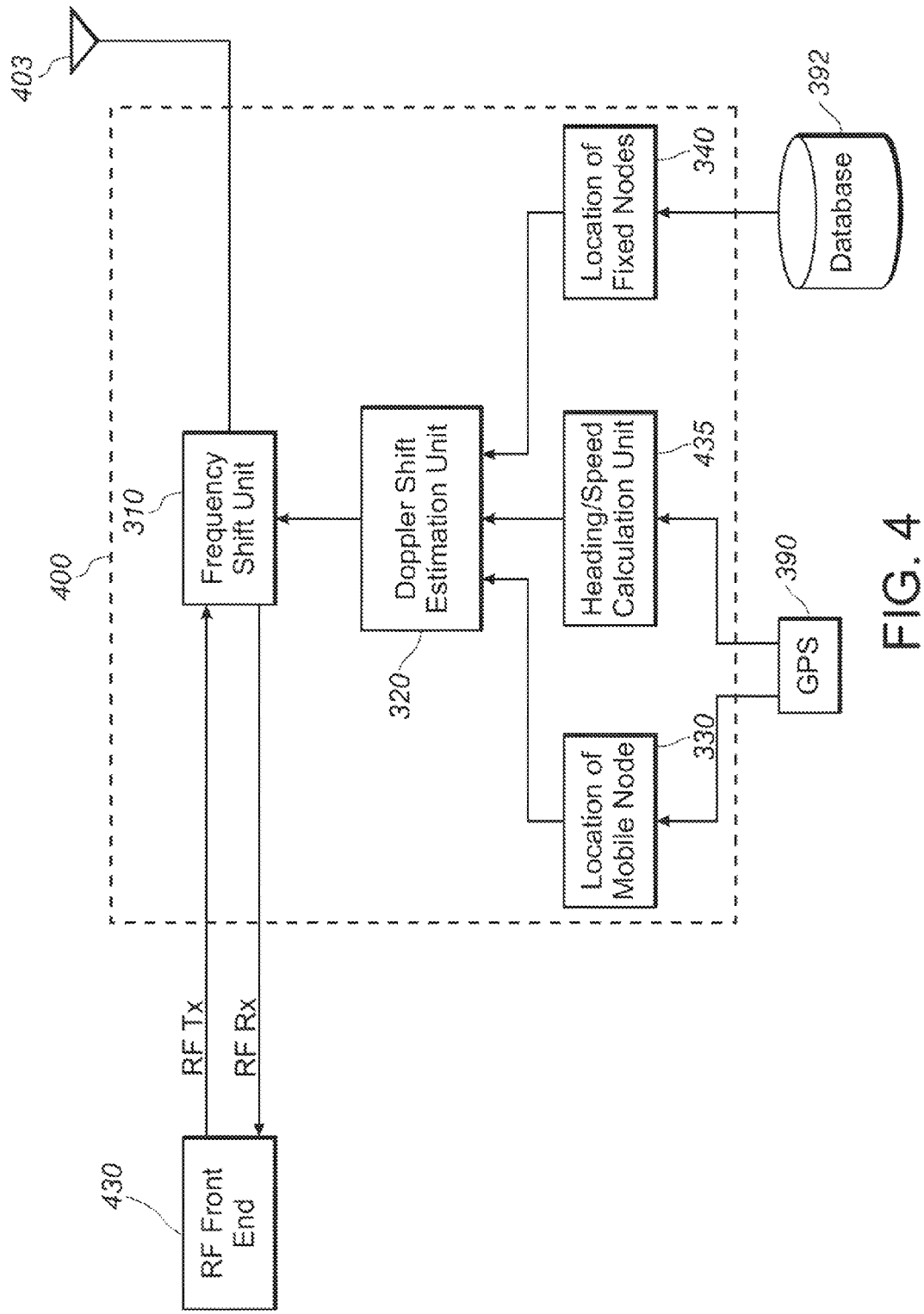

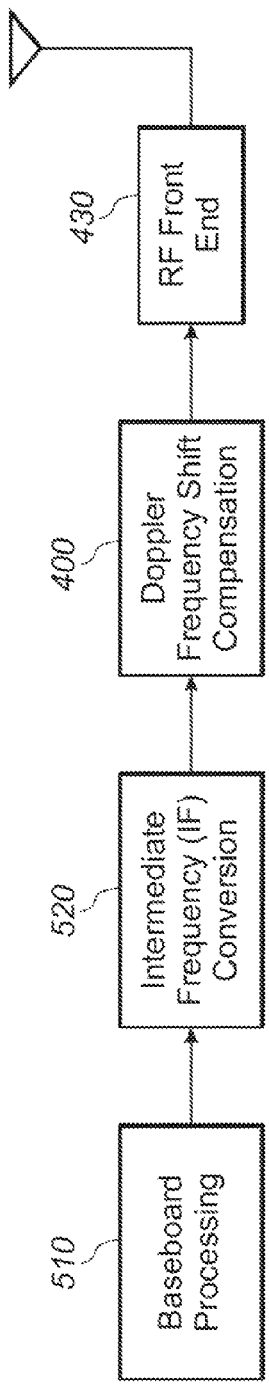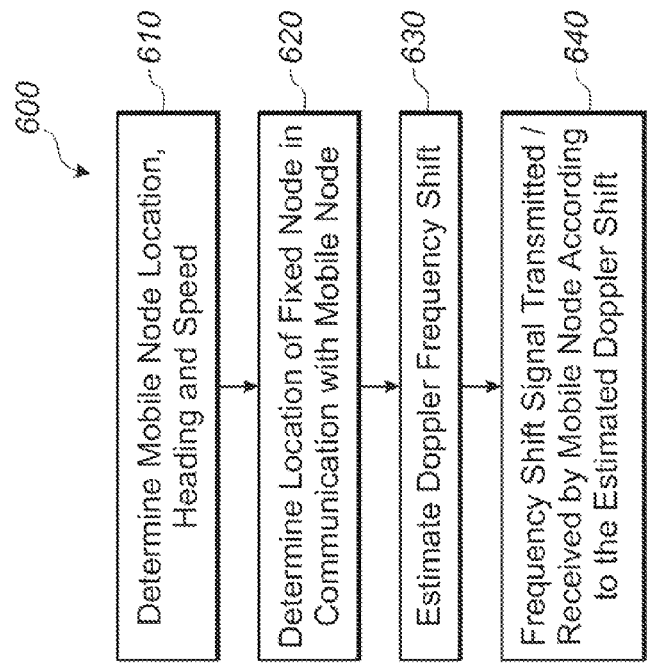

DOPPLER COMPENSATED COMMUNICATIONS LINK

CROSS-REFERENCE TO RELATED APPLICATIONS

This application is related to co-pending U.S. patent application Ser. No. 12/827,632 filed on Jun. 30, 2010 and entitled "Aviation Cellular Communications System and Method," the entirety of which is hereby incorporated herein.

This application also relates to co-pending and concurrently filed U.S. patent application Ser. No. 12/891,139, and entitled "Airborne Cell Tower Selection System and Method" listing James P. Mitchell as inventor, the entirety of which is incorporated herein by reference.

BACKGROUND

Air-to-ground communication links using conventional cellular communication devices are becoming increasingly more feasible. As one example, the author of this disclosure has also filed co-pending U.S. patent application Ser. No. 12/827,632 on Jun. 30, 2010, entitled "Aviation Cellular Communications System and Method." That patent application provides a system for allowing one or more mobile nodes (e.g., mobile phones) to communicate with fixed communication nodes (e.g., cellular base stations) while operating in an aircraft environment. When operating in an aircraft environment, any communication signal transmitted and received by the mobile node would be affected by a Doppler frequency shift given the relatively high speed of an aircraft in relation to the fixed node with which the mobile nodes are in communication.

Doppler frequency shift for many 3G cellular systems (e.g., CDMA2000, W-CDMA, TD-SCDMA, etc.) is a less concerning issue given the top flight speed and path of an aircraft relative to ground towers. However next generation systems LTE will use higher order modulation schemes, yielding 86 to 100 Mbps, that will be more sensitive to Doppler frequency shift, possibly resulting in the loss of communication link or poor bandwidth in high speed/high Doppler frequency shift environments.

Detection and correction of a Doppler frequency shift in the received signal itself (e.g., using a DSP) would be more costly and technically more challenging at very high frequencies and may not be feasible as there is no guarantee that a DSP solution can sample and correct fast enough to avoid bit or symbol loss during synchronization or acquisition. Furthermore, mobile nodes that may be used in an aircraft environment may utilize many different communication standards, including GSM, W-CDMA, CDMA and LTE. As such, it would be preferable to have a Doppler frequency shift compensation method that is applicable on many standards without the need to alter the mobile phone or the cellular base station.

SUMMARY

In view of the foregoing, this disclosure teaches a system and method for compensating for a Doppler frequency shift in communication between a mobile node and a fixed node. A Doppler frequency shift may be estimated based on a known location, speed, and heading of the mobile node in relation to the fixed location of the fixed node. Then, both transmitted and received signals at the mobile node may be frequency shifted to compensate for the estimated Doppler frequency shift. Such a technique allows for more stable communications, faster acquisition, and higher data rates.

The following disclosure includes a system for compensating for a Doppler frequency shift in communications between a mobile node and a fixed node. The system includes a Doppler frequency shift estimation unit configured to estimate the Doppler frequency shift experienced in a communication signal between the mobile node and the fixed node, wherein the Doppler frequency shift is estimated based on a location of the mobile node, a heading of the mobile node, and speed of the mobile node, and a location of the fixed node. The system also includes a frequency shift unit configured to shift a frequency of the communication signal in accordance with the estimated Doppler frequency shift.

The following disclosure also includes a method for compensating for a Doppler frequency shift in communications between a mobile node and a fixed node. The method includes the steps of determining a location, speed, and heading of the mobile node, determining a location of the fixed node, estimating a Doppler frequency shift experienced in a communication signal between the mobile node and the fixed node based on the location of the mobile node, the speed of the mobile node, the heading of the mobile node, and the location of the fixed node, and shifting a frequency of the communication signal in accordance with the estimated Doppler frequency shift.

BRIEF DESCRIPTION OF THE DRAWINGS

FIG. 4 shows a block diagram of a system configured to compensate for a Doppler frequency shift according to an alternate embodiment of the disclosure.

FIG. 5 shows a block diagram of a system configured to compensate for a Doppler frequency shift in an intermediate frequency band.

FIG. 6 shows a flowchart of a method for Doppler frequency shift compensation according to one embodiment of the disclosure.

DETAILED DESCRIPTION

Figure 1:
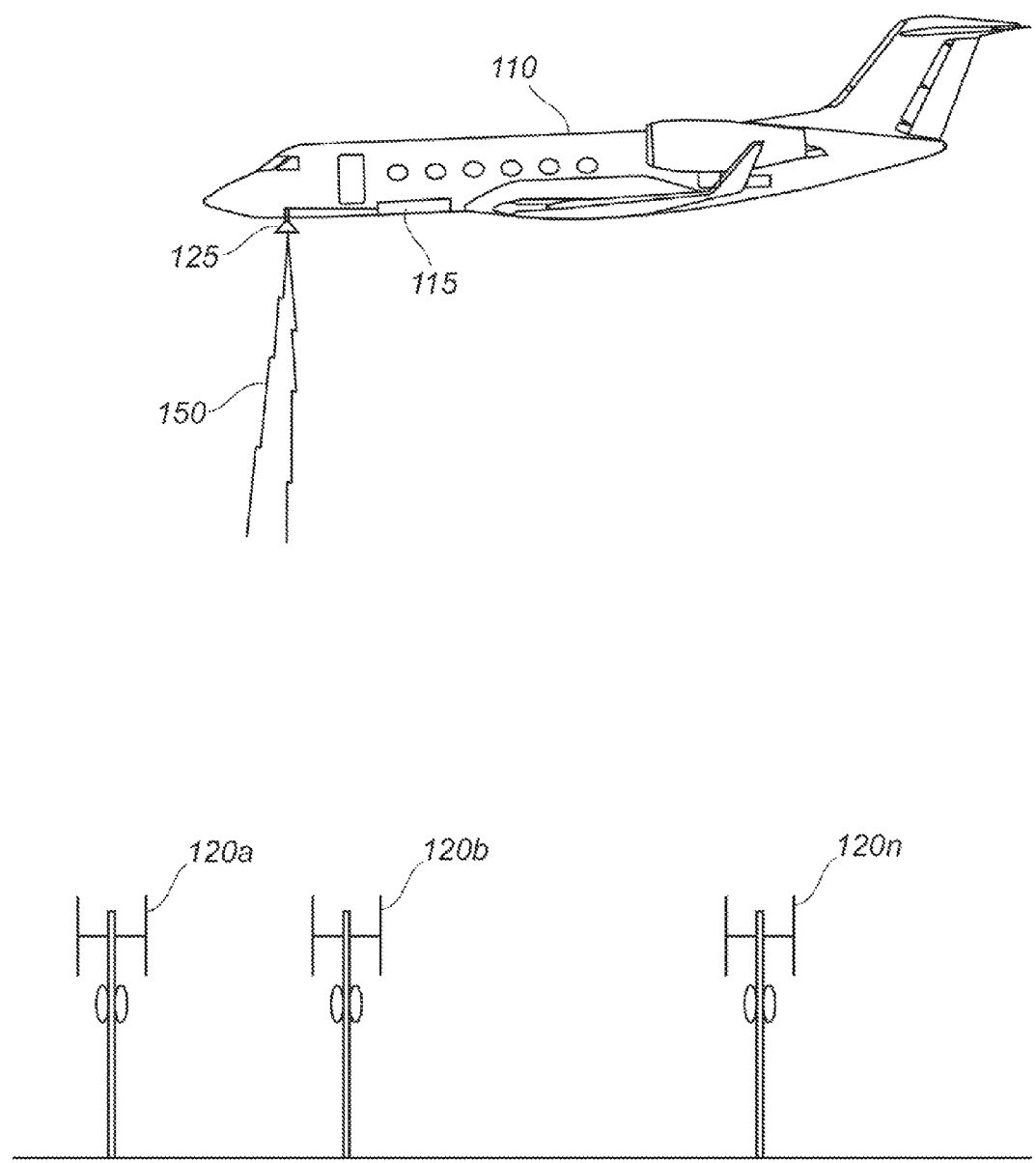
FIG. 1 shows an operating environment for one aspect of the disclosed system.

FIG. 1 shows an operating environment for one aspect of the disclosed system. A vehicle 110 includes a mobile node 115 that broadcasts or delivers communications signal 150 through antenna 125 to a plurality of fixed nodes 120*a-n*. Mobile node 115 may be any type of communication device or system that is operational in a moving environment. As one example, mobile node 115 may be a mobile phone system operating any of the conventional communications standards, including CDMA, CDMA2000, GSM, UMTS, W-CDMA, PCS, LTE (long term evolution), etc. As another example, mobile node 115 may be a data communications system such as WiFi, WiMax, HSDPA, etc. Mobile node 115 may also be used for to receive broadcast cellular video, such as is planned for Blocks DIE of the 700 MHz band.

Fixed nodes 120*a-n* are fixed-location transceivers configured for the communication standard used by mobile node 115. In the case that mobile node 115 is a mobile phone system, fixed nodes 120*a-n* would be mobile phone base stations mounted on towers or buildings. Vehicle 110 is preferably an airplane, but the disclosed system may be applicable for use with any type of aircraft, including helicopters, blimps, balloons, etc. In addition, the disclosed system may be applicable for use in ground vehicles including high-speed trains and transit systems as well as in mobile devices themselves, as will be described in more detail below.

Figure 2:
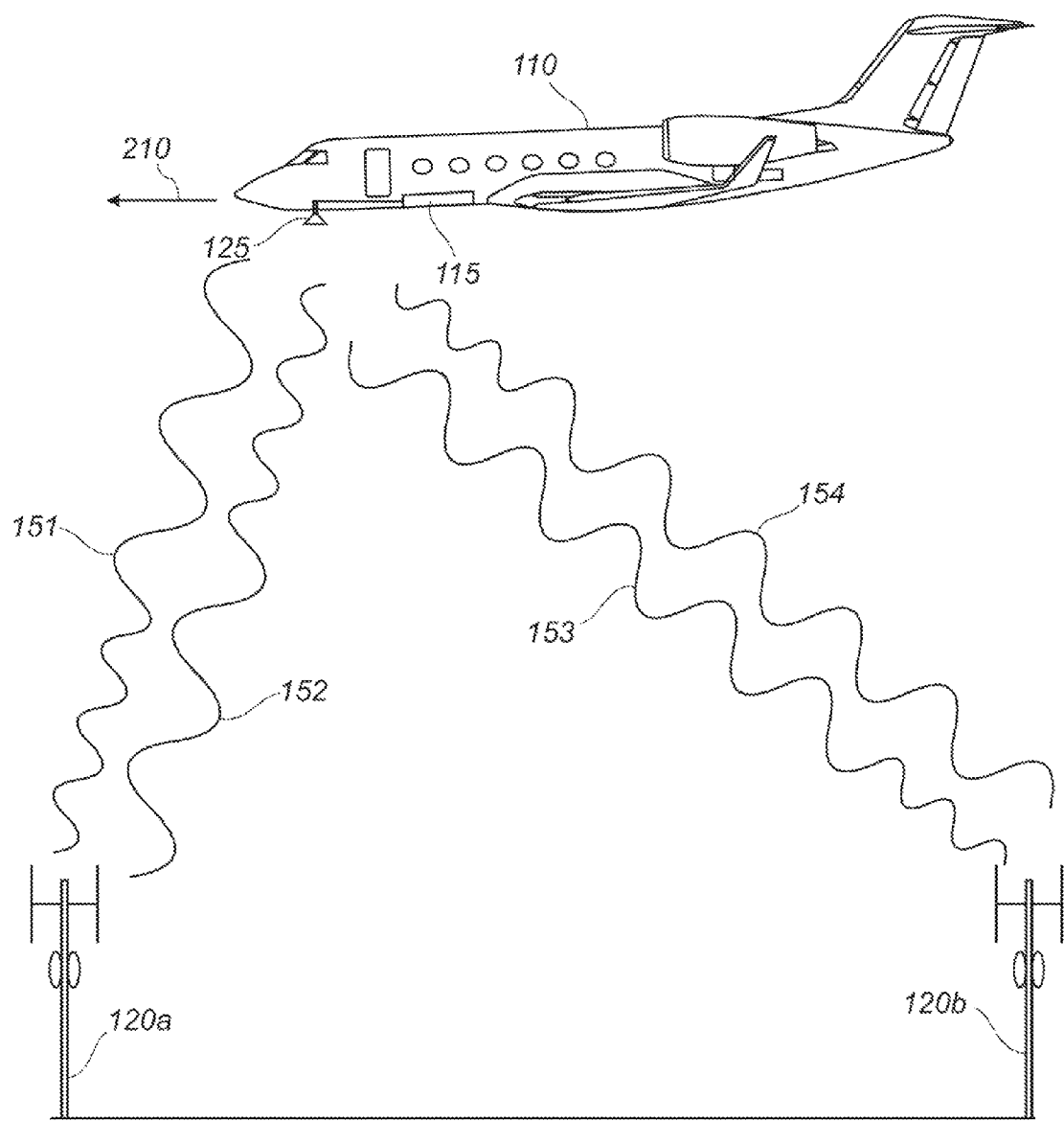
FIG. 2 shows a generalized overview of a Doppler frequency shift in a typical aircraft environment.

FIG. 2 shows a generalized overview of a Doppler frequency shift in a typical aircraft environment. As shown, aircraft 110 is traveling along heading 210 generally in the direction of fixed node 120*a*. In this situation, mobile node 115 transmits a signal 151 to fixed node 120*a*. Since mobile node 115 is moving toward fixed node 120*a*, the frequency of signal 151 becomes compressed at the fixed node. Likewise, the frequency of signal 152 transmitted from fixed node 120*a* to mobile node 115 becomes compressed at the mobile node.

Similarly, if mobile node 115 is communicating with fixed node 120*b*, the frequency of signal 153 is increased at the fixed node as it is transmitted from mobile node 115 to fixed node 120*b*. Likewise, the frequency of signal 154 transmitted from fixed node 120*b* to mobile node 115 is increased at mobile node 115. In general Doppler shift may contribute to synchronization and packet loss due to the misalignment of sampling to the received energy window. A discussion of the effect of Doppler frequency shift may be found in the article, "The effects of Doppler spreads in OFDMA mobile Radio Systems" Robertson, Kaiser, Vehicular Technology Conference, 1999 ISBN: 0-7803-5435-4, which is incorporated herein by reference.

Figure 3:
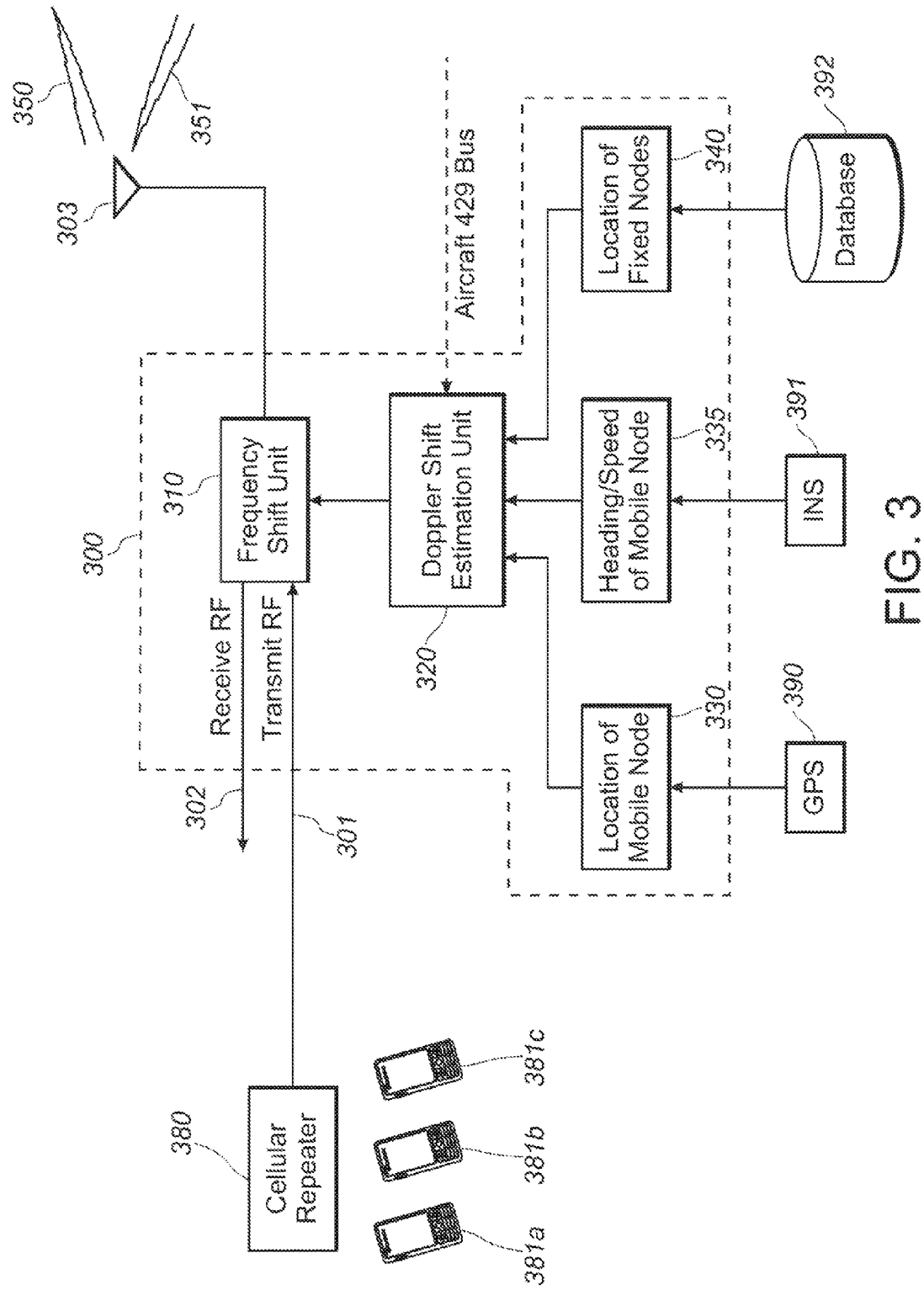
FIG. 3 shows a block diagram of a system configured to compensate for a Doppler frequency shift according to one embodiment of the disclosure.

FIG. 3 shows a block diagram of a system configured to compensate for a Doppler frequency shift according to one embodiment of the disclosure. The "units" and blocks shown in FIGS. 3-8 may be implemented in software operating on a microprocessor, in a DSP, in an ASIC, in dedicated hardware, or in any combination thereof as is suited to the particular application contemplated.

System 300 includes a Doppler shift estimation unit 320 which is configured to estimate a Doppler frequency shift for a given communication link. The Doppler frequency shift is estimated by taking into consideration the location 330 of the mobile node, the heading/speed 335 of the mobile node, and the location 340 of a fixed node being used for the current communication link. As one example for an aircraft environment, the location 330 of the mobile node may be provided by Global Positioning System (GPS) unit 390. Heading/speed 335 may be provided by an Inertial Navigation System (INS) 391. Location 340 for a plurality of fixed nodes may be stored in a database 392.

Once the locations of the mobile node and fixed node and known, a three dimensional distance between the mobile node and the fixed node may be calculated. This distance is calculated successively at two or more different times to compute a relative speed of the mobile node to the fixed node. A Doppler speed may then be calculated by dividing this relative speed by the speed of light. This ratio indicates the Doppler frequency shift and corresponds to the proportional adjustment that should be made to the transmitted or received signal at the mobile node do to compensate for the Doppler frequency shift. The estimated Doppler frequency shift is then passed to frequency shift unit 310.

As shown in FIG. 3, frequency shift unit 310 is configured to shift the frequency of both received and transmitted signals in the RF band based on the estimated Doppler frequency shift. Transmit RF signal 301 is passed to frequency shift unit 310 from any RF transmission source. As one example, the RF transmission source may be a cellular repeater 380. Cellular repeater 380 may be a Wilson Electronics 700, 800, or 1800 MHz Cellular PCS SmartTech amplifier with 50 dB/50 dB of gain. In this example, communication signals from mobile phones 381*a-c* are repeated by cellular repeater 380 and passed to frequency shift unit 310 to compensate for the estimated Doppler frequency shift.

Figure 7:
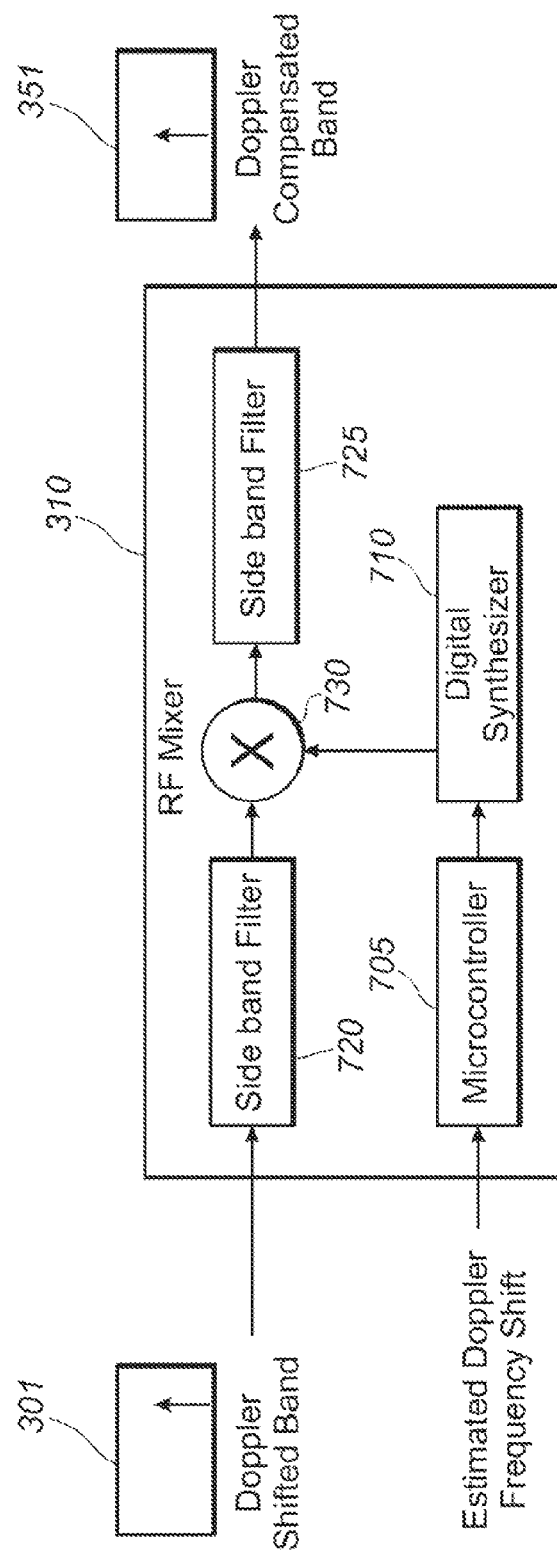
FIG. 7 shows a block diagram of s frequency shift unit according to one embodiment of the disclosure.

FIG. 7 shows a block diagram of a preferred embodiment for frequency shift unit 310 in more detail. Frequency shift unit 310 receives the estimated Doppler frequency shift from Doppler shift estimation unit 320. As described above, estimated Doppler frequency shift is calculated from the ratio of the relative speed of the mobile node to the tower divided by the speed of light. This estimated Doppler frequency shift is supplied to microcontroller 705 which controls digital synthesizer 710 to produce a frequency corresponding to the estimated Doppler frequency shift. In this example, transmit RF signal 301 is the signal that is expected to experience a Doppler frequency shift. The frequency produced by digital synthesizer 710 is mixed with transmit RF signal 301 with RF mixer 730. Side band filter 720 and 725 may optionally be used to suppress the sidebands. The result of the mixing is a Doppler compensated transmitted signal 351. This example shows Doppler compensation for a transmitted signal, but would apply in the same manner (just in reverse) for a received signal.

System 300 may also be used to frequency shift received RF signals based on an estimated Doppler frequency shift. In this case, RF signal 350, such as from a fixed cellular base station, is received through antenna 330. Next, frequency shift unit 310 applies the frequency shift as described above based on the estimated Doppler frequency shift provided by Doppler shift estimation unit 320. Then, frequency shifted received RF signal 302 may be passed to a receiver system, such as one described in U.S. patent application Ser. No. 12/827,632 filed on Jun. 30, 2010 and entitled "Aviation Cellular Communications System and Method."

In the embodiment shown in FIG. 3, Doppler frequency shift compensation may be accomplished in a system outside the communicating nodes (i.e., the mobile node and the fixed node) and leaves the communication electronics for the mobile nodes (e.g., mobile phones, the cellular repeaters, etc.) and the fixed nodes (e.g., cellular base stations) undisturbed. FIG. 4 shows an embodiment where Doppler frequency shift compensation is accomplished within the mobile node itself (e.g., a cellular repeater, mobile phone etc.). Handling compensation for Doppler frequency shift within the device itself allows for more reliable communications in land-based environments (e.g., high speed trains, fast-moving cars). Such a system is made more feasible by the fact that most modern mobile phones have built in GPS devices. As such, heading, speed, and location may be calculated without the use of aircraft specific sensors like an INS.

FIG. 4 shows a block diagram of a system configured to compensate for a Doppler frequency shift according to an alternate embodiment of the disclosure. In this embodiment, system 400 may be housed internally in a mobile node between RF front end electronics 430 and antenna 403, such as in a mobile phone or cellular repeater. The operation of frequency shift unit 310 and Doppler shift estimation unit 320 is the same as described above. However, rather than receiving heading/speed information from a sensor like an aircraft-based INS, system 400 utilizes a heading/speed calculation unit 435 to calculate the heading and speed of the mobile node. This may be accomplished by taking multiple GPS position readings in time from GPS unit 390 and calculating the heading and speed from these successive readings. Again, locations 340 of the fixed nodes (e.g., cellular base stations) may be accessed through database 392. This database may be resident on the mobile phone itself or may be made accessible over a network such as the Internet.

Using the embodiment shown in FIG. 4, RF signals transmitted by and received through RF front end electronics 430 may be frequency shifted based on a calculated heading/speed of the mobile node itself. As such, Doppler frequency shift compensation may be achieved at the mobile phone level. This allows for Doppler compensation when mobile phones are used in high-speed trains or fast-moving cars where the affects of Doppler frequency shift may become noticeable.

The previously described embodiments have shown the Doppler frequency shift compensation being accomplished in the RF. However, the techniques described above are not limited to this band of the spectrum. As shown in FIG. 5, system 400 may be positioned in a mobile node, such as a mobile phone, in the intermediate frequency between baseband processing and the RF front end of the node. Lower frequencies associated with the IF may make things slightly easier as the synthesizer in the compensating circuit gets easier to produce.

FIG. 6 shows a flowchart of a method 600 for Doppler frequency shift compensation according to one embodiment of the disclosure. First in step 610, the location, heading, and speed of a mobile node are determined. As mentioned above, the mobile node may be any type of communication device. Location of the mobile node may be determined using any method, but is preferably determined using a GPS unit. Heading and speed may be determined using any technique. One preferable method for determining heading and speed, especially in an aircraft environment is to use an INS. An alternative method for determining heading and speed involves calculating heading and speed from successive GPS measurements in time, as described above.

Next in step 620, the location of a fixed node with which the mobile node is communicating with is determined. Preferably, the locations of fixed nodes are stored in a database. In step 630, a Doppler frequency shift is estimated based on the determined location, heading, and speed of the mobile node as well as the location of the fixed nodes. Estimation of the Doppler frequency shift may be accomplished according to the techniques described above with reference to FIG. 3.

Finally in step 640, a communication signal transmitted by or received by the mobile node is frequency shifted in accordance with the estimated Doppler frequency shift. Frequency shifting the transmitted or received signals of the mobile node may be done in either the RF or IF band and may be accomplished with the techniques described above with reference to FIG. 3.

Figure 8:
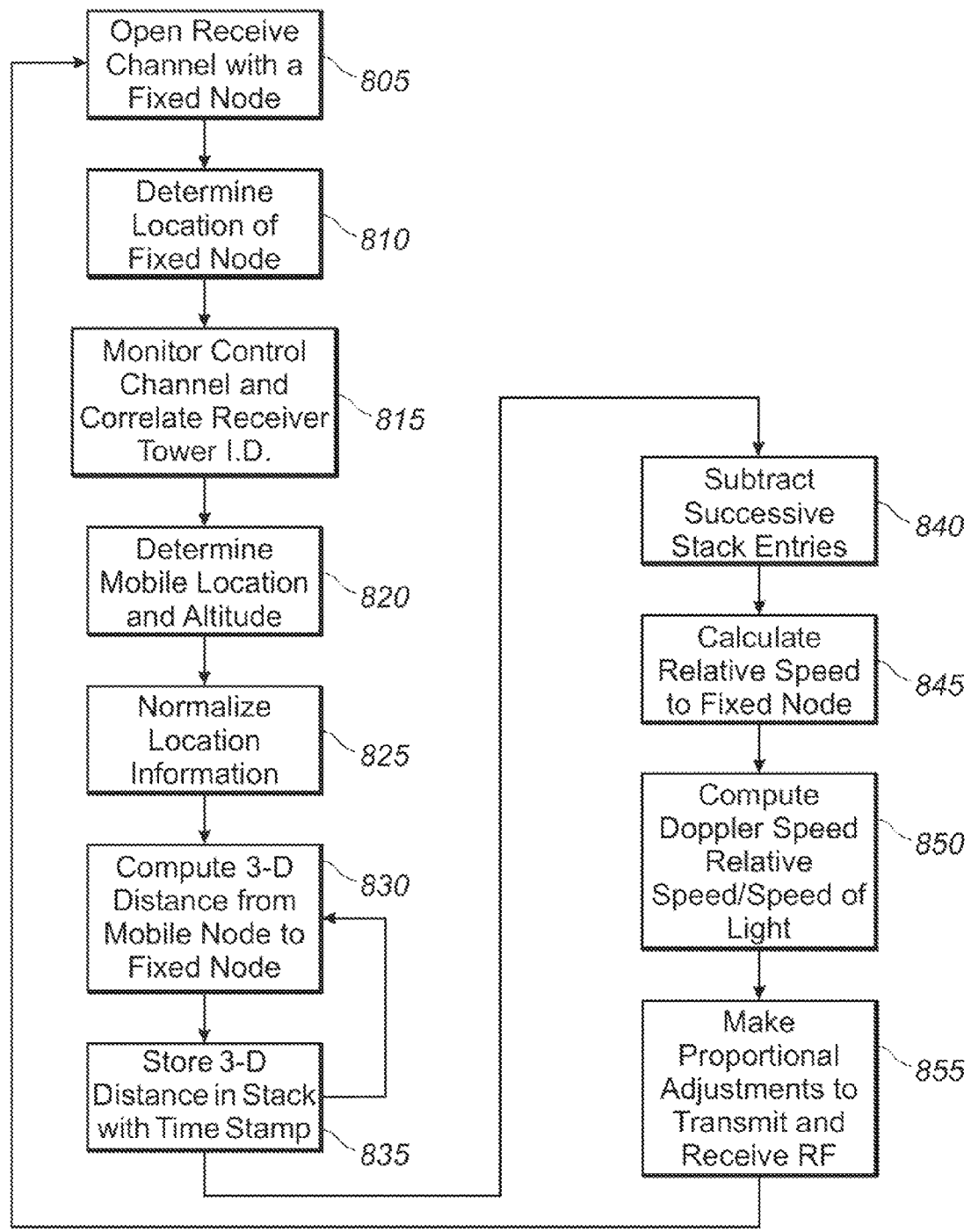
FIG. 8 shows a flowchart of a preferred method for Doppler frequency shift compensation according to a preferred embodiment of the disclosure.

FIG. 8 shows a flowchart of a method 800 for Doppler frequency shift compensation according to a preferred embodiment of the disclosure. In step 805, a receive channel with a fixed node is established at a mobile node. Next in step 810, the location of the fixed node with which a receive channel has been established is determined. Preferably, the location of the fixed node is stored in a database. One method, as shown in step 815, for determining the identify and location of the fixed node is to listen for the Broadcast Control Channel (BCCH) transmitted by the fixed node and cross-correlate a tower identification code in the BCCH with entries listing fixed node locations (e.g., latitude and longitude) in a database. Techniques for determining the locations of fixed nodes, including the use of tower identifications, are discussed in more detail in co-pending U.S. patent application Ser. No. 12/891,139, and entitled "Airborne Cell Tower Selection System and Method" listing James P. Mitchell as inventor, the entirety of which is incorporated herein by reference. Once the location of the fixed node has been determined, step 820 identifies the mobile node location and altitude. GPS or INS may be used to determine mobile node location and heading.

In step 825, the location information for the mobile node and fixed node are normalized. This step is optional and is only helpful for situations where the location information for the mobile nodes and fixed nodes are in different units when initially sensed. Next in step 830, the three-dimensional distance between the mobile node and fixed node is calculated based on the location of the fixed node and the location and altitude of the mobile node. In step 835, the three-dimensional distance is stored in a stack and marked with a time stamp. Step 830 continues to repeat at successive time stamps and continues to store three-dimensional distances in step 835.

In step 840, two successive entries of three-dimensional distances are subtracted. In step 845, based on the previous subtraction, a relative speed of the mobile node to the fixed node is calculated. Next, in step 850, the Doppler speed is calculated by dividing the calculated relative speed by the speed of light. Finally, in step 855, this ratio is used to proportionally shift the receive and/or transmit signals between the mobile node and the fixed node. This frequency shift effects both the carriers and the information band. The whole process then repeats.

What is claimed is:

1. A system for compensating for a Doppler frequency shift in communications between a plurality of mobile nodes and a fixed node, comprising:
    a mobile transmission source housed within an aircraft, the mobile transmission source being configured to repeat communications between the a plurality of mobile nodes and the fixed node;
    a GPS unit for determining a location associated with the mobile transmission source;
    an INS unit for determining a heading and a speed associated with the mobile transmission source;
    a Doppler frequency shift estimation unit located external to the mobile transmission source, the Doppler frequency shift estimation unit being configured to estimate the Doppler frequency shift experienced in a communication signal between the mobile transmission source and the fixed node, wherein the Doppler frequency shift is estimated based on the location, the heading, and the speed associated with the mobile transmission source and a location of the fixed node, wherein the location of the fixed node is determined by at least one of a microprocessor, a DSP, and an ASIC configured to detect a broadcast control channel transmitted by the fixed node including an identification code and further configured to cross-correlate the identification code with entries stored in a databased including a listing of a plurality of locations corresponding to a plurality of fixed nodes; and
    a frequency shift unit located external to the mobile transmission source, the frequency shift unit being configured to shift a frequency of the communication signal in accordance with the estimated Doppler frequency shift, wherein the frequency shift unit comprises a digital synthesizer configured to produce a shifting frequency corresponding to the estimated Doppler frequency shift and RF mixer configured to mix the shifting frequency with the communication signal.

2. The system of claim 1, wherein the communication signal is received by the mobile transmission source from the fixed node and transmitted to at least one of the plurality of mobile nodes.

3. The system of claim 1, wherein the communication signal is received by the mobile transmission source from at least one of the plurality of mobile nodes and transmitted from the mobile transmission source to the fixed node.

4. The system of claim 1, wherein the plurality of mobile nodes include a plurality of mobile phones.

5. The system of claim 1, wherein the Doppler frequency shift estimation unit estimates the Doppler frequency shift by computing a relative speed between the mobile transmission source and the fixed node.

6. The system of claim 5, wherein the Doppler frequency shift estimation unit divides the relative speed by the speed of light.

7. A method for compensating for a Doppler frequency shift in communications between a plurality of mobile nodes and a fixed node, comprising the steps of:
    determining a location, speed, and heading associated with a mobile transmission source housed within an aircraft, the mobile transmission source being configured for repeating communications between the plurality of mobile nodes and the fixed node, wherein the location of the mobile transmission source is determined using a GPS unit, and wherein the heading and the speed of the mobile transmission source are determined using an INS unit;
    determining a location of the fixed node by detecting a broadcast control channel transmitted by the fixed node including an identification code and cross-correlating the identification code with entries stored in a database including a listing of a plurality of locations corresponding to a plurality of fixed nodes;
    estimating a Doppler frequency shift experienced in a communication signal between the mobile transmission source and the fixed node via a Doppler frequency shift unit located external to the mobile transmission source; the estimated Doppler frequency shift being based on the location, the speed, and the heading associated with the mobile transmission source and the location of the fixed node; and
    shifting a frequency of the communication signal in accordance with the estimated Doppler frequency shift, via a frequency shift unit located external to the mobile transmission source, by producing a shifting frequency corresponding to the estimated Doppler frequency shift and mixing the shifting frequency with the communication signal.

8. The method of claim 7, wherein the communication signal is received by the mobile transmission source from the fixed node and transmitted to at least one of the plurality of mobile nodes.

9. The method of claim 7, wherein the communication signal is received by the mobile transmission source from at least one of the plurality of mobile nodes and transmitted from the mobile transmission source to the fixed node.

10. The method of claim 7, wherein the estimating step estimates a Doppler frequency shift by computing a relative speed between the mobile transmission source and the fixed node.

11. The system of claim 4, wherein the mobile transmission source comprises a cellular repeater in communication with the plurality of mobile phones.

12. The system of claim 11, wherein the frequency shift unit is configured to receive the communication signal from the cellular repeater, the communication signal including at least one communication received by the cellular repeater from at least one of the plurality of mobile phones.

\* \* \* \* \*